(12) United States Patent
Wang

(10) Patent No.: US 7,510,248 B2
(45) Date of Patent: Mar. 31, 2009

(54) WHEEL RIM COVER MOUNTING STRUCTURE

(76) Inventor: Yen Ching Wang, No. 82, Wan Shing St., San Min Dist., Kaohsiung 807-94 (TW)

( * ) Notice: Subject to any disclaimer, the term of this patent is extended or adjusted under 35 U.S.C. 154(b) by 43 days.

(21) Appl. No.: 11/807,168

(22) Filed: May 24, 2007

(65) Prior Publication Data

US 2008/0290720 A1  Nov. 27, 2008

(51) Int. Cl.
 *B60B 7/12* (2006.01)
(52) U.S. Cl. .............................. 301/37.33; 301/37.102
(58) Field of Classification Search ............ 301/37.101, 301/37.102, 37.31, 37.34–37.36
 See application file for complete search history.

(56) References Cited

U.S. PATENT DOCUMENTS 4,991,909 A * 2/1991 Hamada ................. 301/37.36
5,988,762 A * 11/1999 Asada et al. ........... 301/37.109
6,517,168 B1 * 2/2003 Van Houten ............. 301/37.42
7,147,289 B2 * 12/2006 Nakamura ............... 301/37.28
7,314,255 B2 * 1/2008 Wang ..................... 301/37.33
2003/0047987 A1 * 3/2003 Enomoto et al. ....... 301/37.101

* cited by examiner

*Primary Examiner*—Jason R Bellinger
(74) *Attorney, Agent, or Firm*—Pro-Techtor Int'l Services

(57) ABSTRACT

A wheel rim cover mounting structure includes a wheel rim having equiangularly spaced mounting slots, a wheel rim cover, which has protruding flanges respectively inserted into the mounting slots of the wheel rim, protruding strips extending from the protruding flanges at an inner side and respectively stopped against the inner end edges of the mounting slots, and plugholes respectively provided at the protruding flanges at an outer side, and retaining spring plates each having a toothed plug panel respectively plugged into the plugholes of the wheel rim cover and a stop panel obliquely extending from the plug panel and stopped at the back side of the wheel rim and an oblique face panel obliquely extending from the stop panel opposite to the plug panel in direction reversed to the extending direction of the stop panel from the plug panel.

4 Claims, 6 Drawing Sheets

A-A'

WHEEL RIM COVER MOUNTING STRUCTURE

BACKGROUND OF THE INVENTION

1. Field of the Invention

The present invention relates to a concave type vehicle wheel rim and more specifically, to a wheel rim cover mounting structure, which ensures connection tightness between the wheel rim cover and the concave wheel rim.

2. Description of the Related Art

A concave wheel rim is a particular steel rim for car. An ordinary wheel rim cover cannot be used to cover a concave wheel rim, i.e., a concave wheel rim must be covered with a particular wheel rim cover.

A conventional wheel rim cover 100 for covering a concave wheel rim 30, as shown in FIG. 1, comprises a plurality of retaining troughs 101 protruded from the back side of the cover body 10 and equiangularly spaced along the border for receiving a respective hook plate 20. Each hook plate 20 has a hook portion 201 hooked on the peripheral edge 301 of the concave wheel rim 30 (see FIGS. 2 and 3).

In order to keep the rotation of the concave wheel rim 30 in balance, counterweights (not shown) may be fastened to the border area of the wheel rim 30. The counterweights may hinder the installation of the hook plates 20. In this case, the wheel rim cover 100 may not fit the surface of the concave wheel rim 30 perfectly, and the wheel rim cover 100 may be forced out of place or away from the concave wheel rim 30 upon a vibration of the car.

The wheel rim cover 100 further comprises a plurality of equiangularly spaced through holes 102 cut through the front and back sides of the cover body 10 corresponding to the mounting slots 302 of the concave wheel rim 30 (see FIGS. 1 and 2), a plurality of protruding flanges 103 perpendicularly protruded from the back side of the cover body 10 around the border of each of the through holes 102, a plurality of plugholes 104 respectively provided at two sides of each of the protruding flanges 103, and a plurality of retaining spring plates 40 respectively plugged into the plugholes 104 and secured to the peripheral edges of the mounting slots 302 of the concave wheel rim 30 to lock the wheel rim cover 100 to the concave wheel rim 30.

This design still cannot eliminate the aforesaid drawback, i.e., the counterweights at the concave wheel rim 30 may hinder the installation of the hook plates 20 or affect the connection tightness between the hook plates 20 and the concave wheel rim 30. Further, because two retaining spring plates 40 are provided at two sides of each protruding flange 103 and stopped against two opposite side edges of the corresponding slot 302, the connection tightness between each protruding flange 103 and the associating mounting slot 302 is not good. When the car is moving over an uneven road surface, the retaining spring plates 40 may be forced to move relative to the associating mounting slots 302 or even to escape from the associating mounting slots 302. Further, the sharp side edges of the retaining spring plates 40 may scratch the surface of the concave wheel rim 30 during installation. A scratch surface damage may cause the concave wheel rim 30 to rust easily.

SUMMARY OF THE INVENTION

The present invention has been accomplished under the circumstances in view. It is therefore the main object of the present invention to provide a wheel rim cover mounting structure, which secures the wheel rim cover to the wheel rim firmly in place. It is another object of the present invention to provide a wheel rim cover mounting structure, which prevents scratch surface damage of the wheel rim during installation of the wheel rim cover.

To achieve these and other objects of the present invention, the wheel rim cover mounting structure comprises a concave wheel rim, a wheel rim cover covered on the concave wheel rim, and a plurality of retaining spring plates that secure the wheel rim cover to the wheel rim. The concave wheel rim has a plurality of mounting slots. The wheel rim cover comprises a plurality of through holes corresponding to the mounting slots, a plurality of protruding flanges respectively perpendicularly extending from a back side thereof around each of the through holes and respectively inserted into the mounting slots, a plurality of plugholes respectively provided at the protruding flanges, and a plurality of protruding strips protruded from the protruding flanges at an inner side and respectively stopped at the inner end edges of the associating mounting slots. The retaining spring plates each comprise a plug panel respectively plugged into the plugholes of said wheel rim cover, a stop panel obliquely extending from one side of the plug panel and stopped at the back side of the wheel rim, and an oblique face panel obliquely extending from one side of the stop panel opposite to the plug panel in a direction reversed to the extending direction of the stop panel from the plug panel.

Further, the stop panel and the oblique face panel each have two opposite lateral side edges smoothly chamfered to prevent scratch surface damage of the wheel rim by the retaining spring plates during installation of the wheel rim cover.

DETAILED DESCRIPTION OF THE PREFERRED EMBODIMENT

Figure 1:
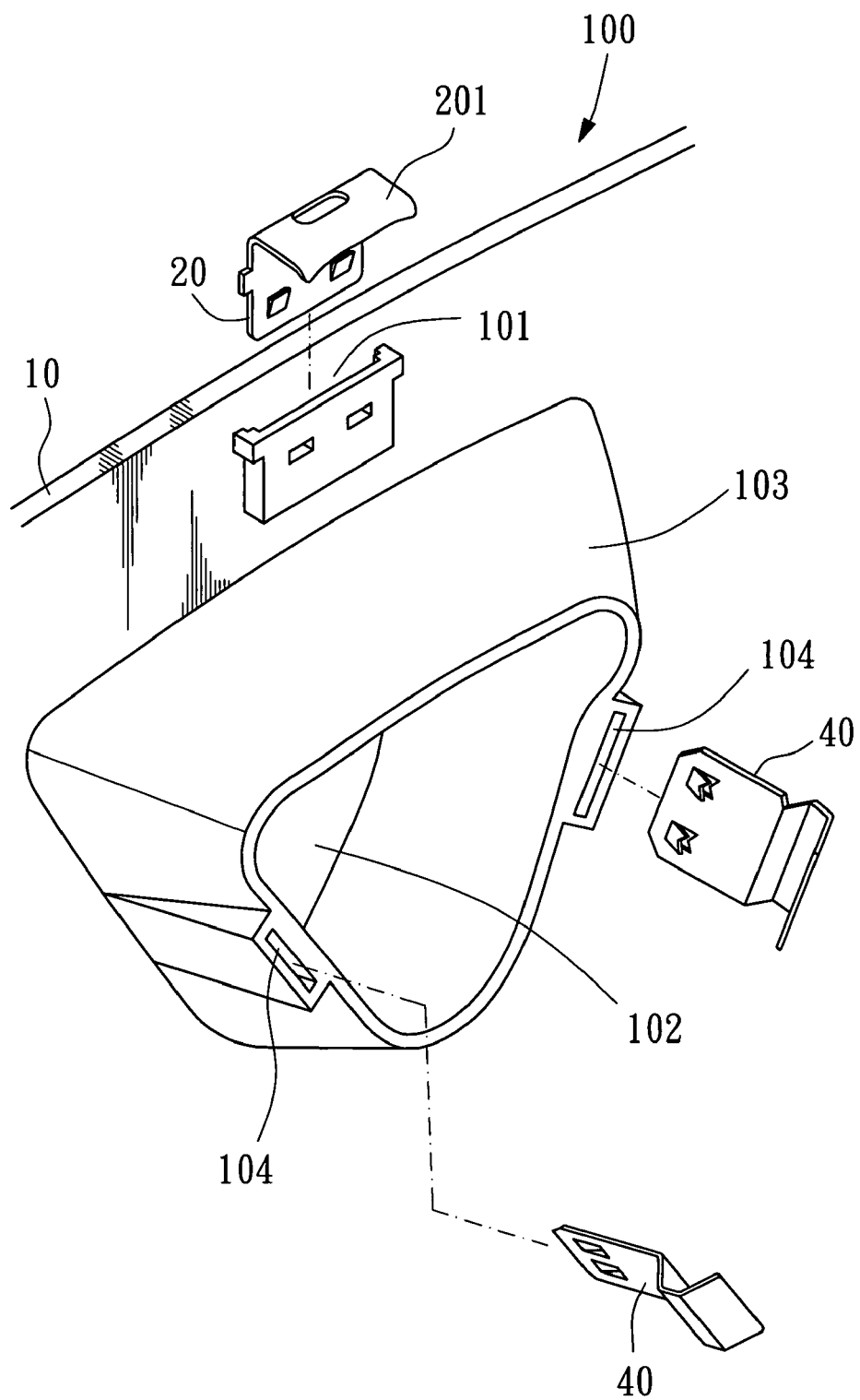
FIG. 1 is an exploded view of a part of a wheel rim cover mounting structure according to the prior art.
Figure 2:
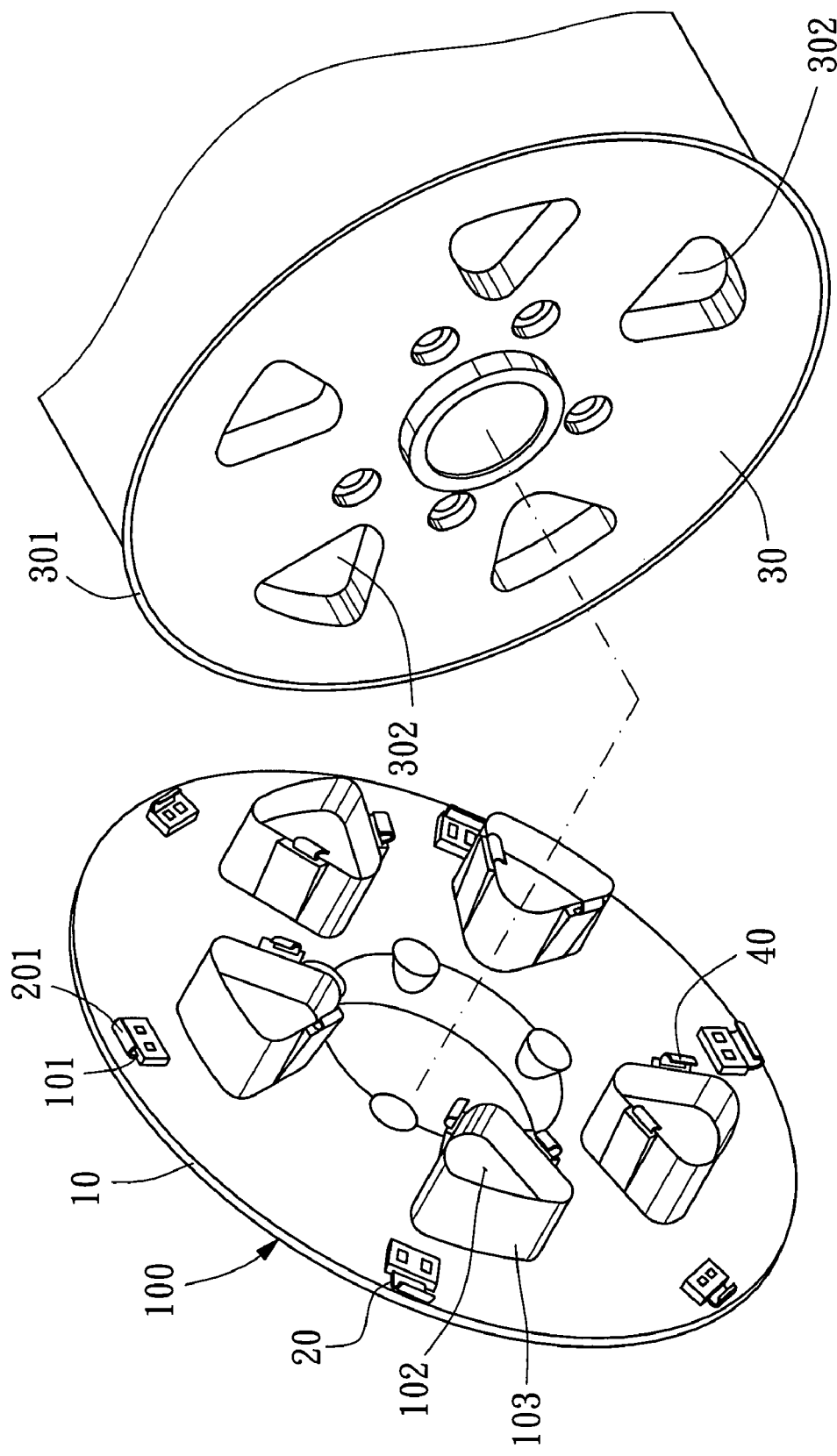
FIG. 2 is an exploded view of the wheel rim cover mounting structure according to the prior art.
Figure 3:
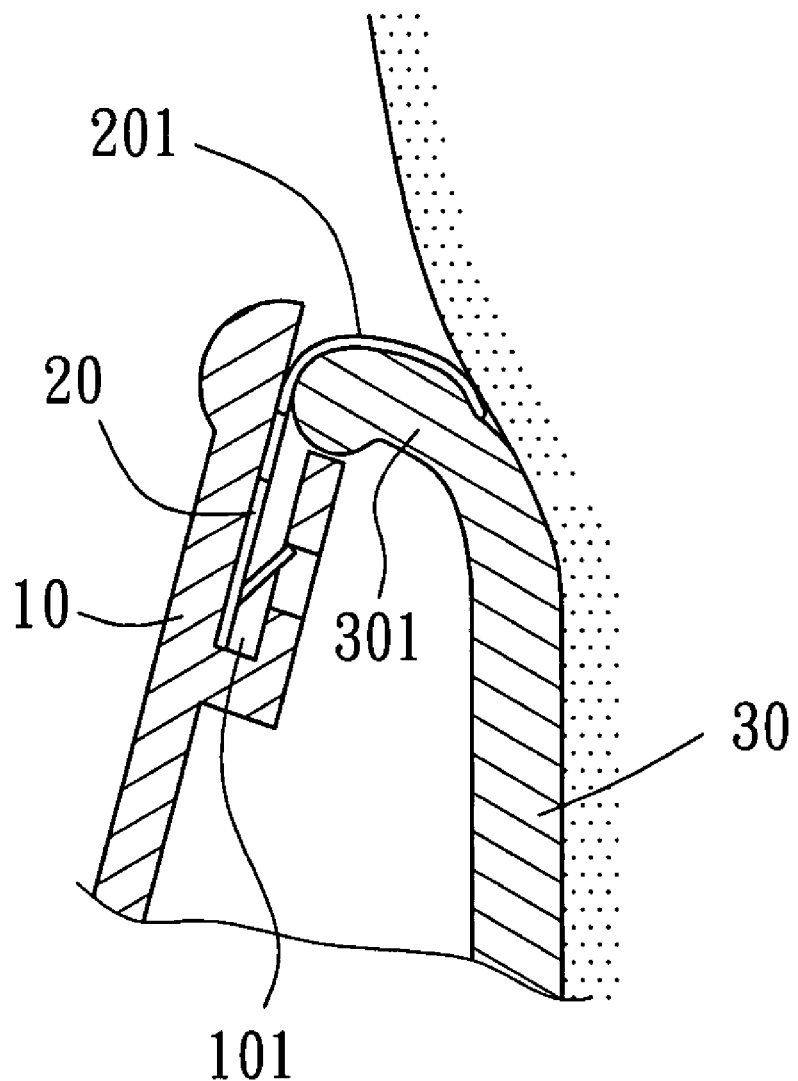
FIG. 3 is a schematic sectional assembly view of a part of the assembly shown in FIG. 2.
Figure 4:
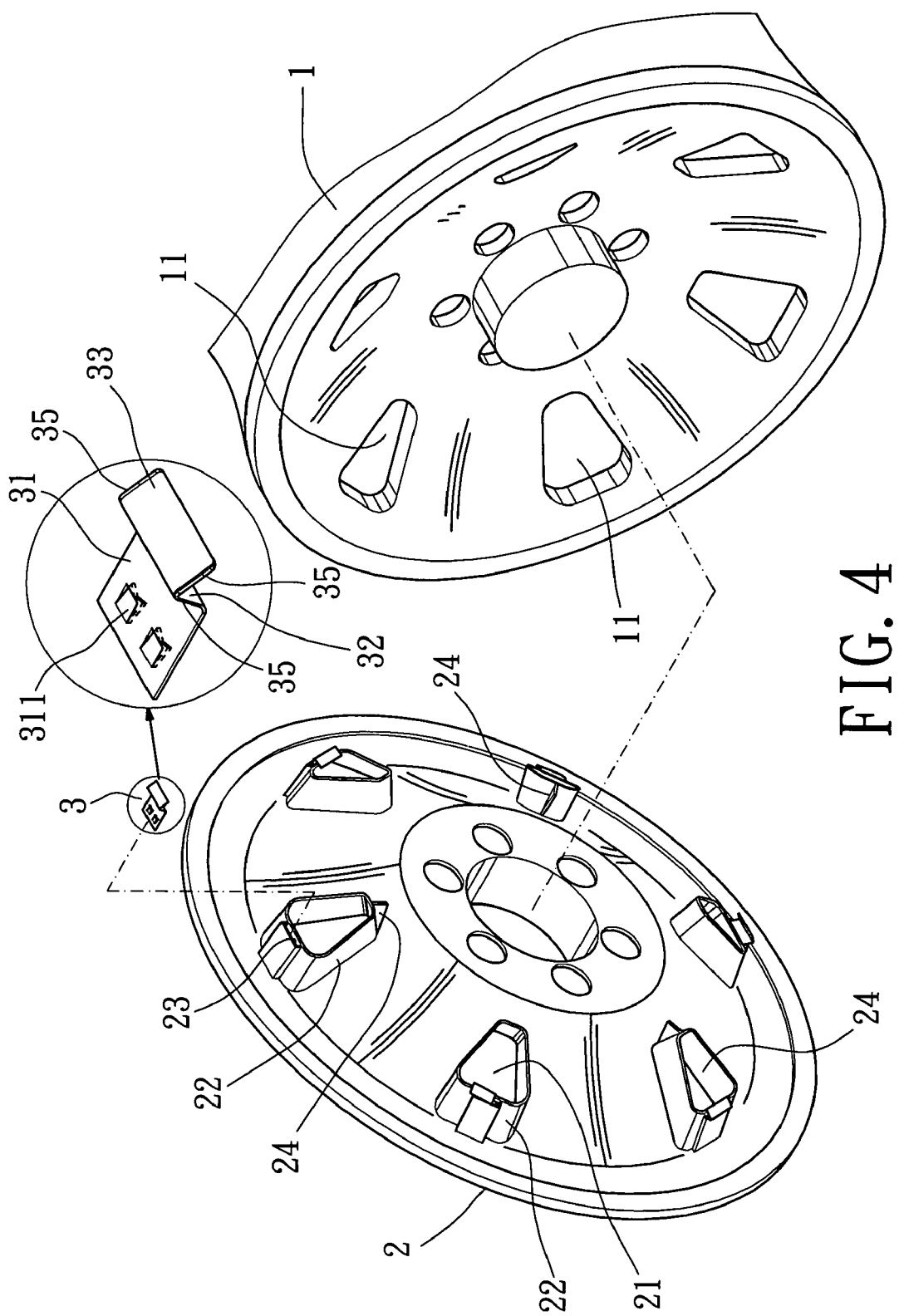
FIG. 4 is an exploded view of a wheel rim cover mounting structure according to the present invention.

Referring to FIG. 4, a wheel rim cover mounting structure in accordance with the present invention is shown comprising a wheel rim 1, a wheel rim cover 2 covering the wheel rim 1, and a plurality of retaining spring plates 3 that secure the wheel rim cover 2 to the wheel rim 1 firmly.

The wheel rim 1 is a concave wheel rim, having a plurality of equiangularly spaced mounting slots 11. The wheel rim cover 2 comprises a plurality of through holes 21 corresponding to the mounting slots 11 of the wheel rim 1, a plurality of protruding flanges 22 respectively perpendicularly protruded from the back side around each of the through holes 21 for engaging the mounting slots 11 of the wheel rim 1, and a plurality of plugholes 23 respectively provided at one side of each of the protruding flanges 22 far from the center of the wheel rim cover 2. The wheel rim cover 2 further comprises a plurality of protruding strips 24 provided at the protruding flanges 22. According to this embodiment, the number of the protruding strips 24 is one half of the number of the protruding flanges 22, and the protruding strips 24 are respectively protruding from one side of each of the odd number (or even number) protruding flanges 22 opposite to the associating plughole 23. Alternatively, the number of the protruding strips 24 can be equal to the number of the protruding flanges 22. In this case, the protruding flange 22 is provided with one protruding strip 24.

Figure 5:
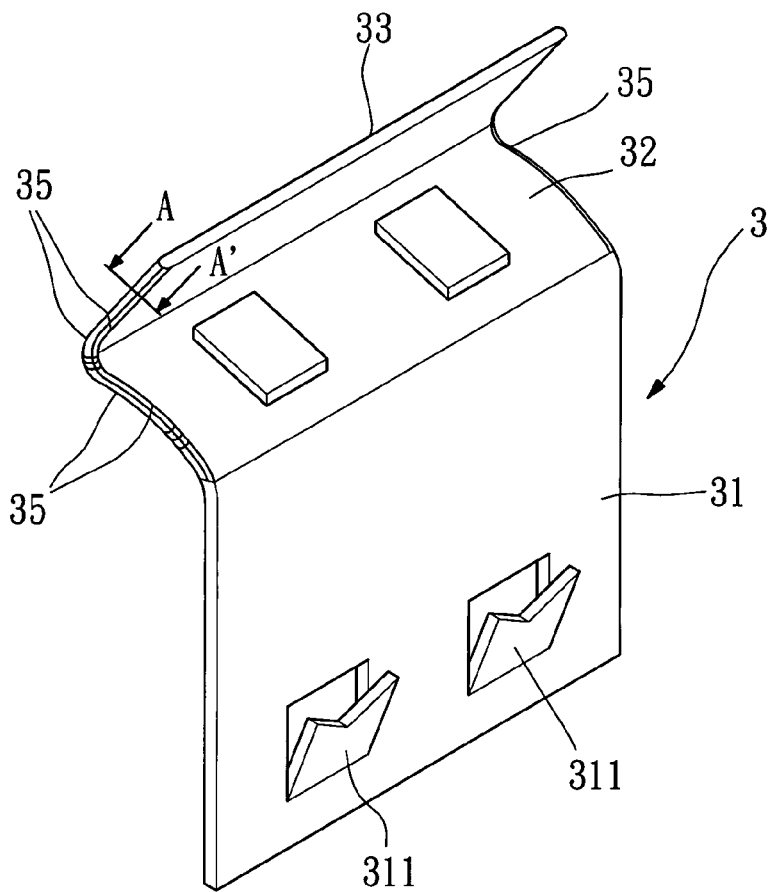
FIG. 5 is an elevational view in an enlarged scale of one retaining spring plate for the wheel rim cover mounting structure according to the present invention.
Figure 6:
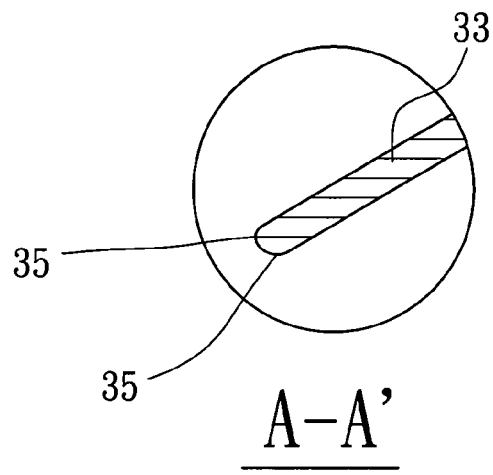
FIG. 6 is a sectional view taken along line A-A' of FIG. 5.

Referring to FIGS. 5 and 6 and FIG. 4 again, the retaining spring plates 3 each comprises a plug panel 31 for insertion into the plugholes 23 of the wheel rim cover 2 respectively, an oblique face panel 33, a stop panel 32 connected between the plug panel 31 and the oblique face panel 33, and a plurality of teeth 311 protruded from the plug panel 31 at one side for securing the plug panel 31 to the associating plughole 23. The stop panel 32 extends from one side of the plug panel 31 obliquely or in a smoothly arched manner subject to the configuration of the outer side of each mounting slot 11 of the wheel rim 1. The oblique face panel 33 extends from one side of the stop panel 32 opposite to the plug panel 31 obliquely. The sloping direction of the oblique face panel 33 is reversed to the sloping direction of the stop panel 32. Further, the stop panel 32 and the oblique face panel 33 each have the respective two opposite lateral side edges chamfered 35 (see FIG. 6).

Figure 7:
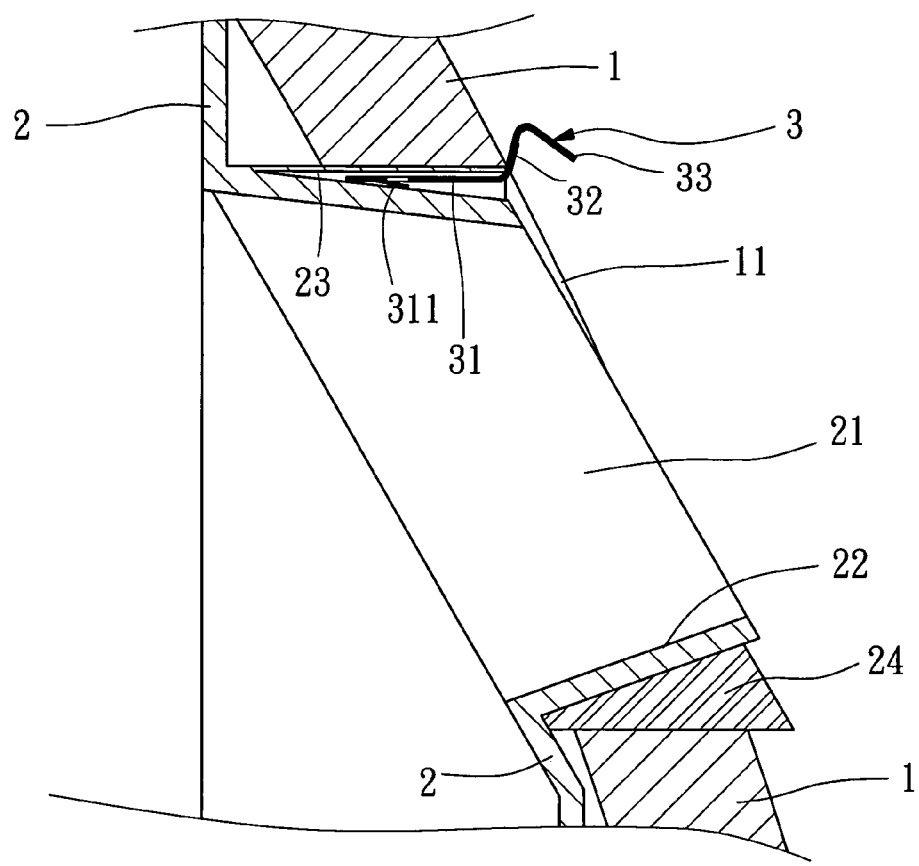
FIG. 7 is a schematic sectional view assembly view of a part of the wheel rim cover mounting structure according to the present invention.
Figure 8:
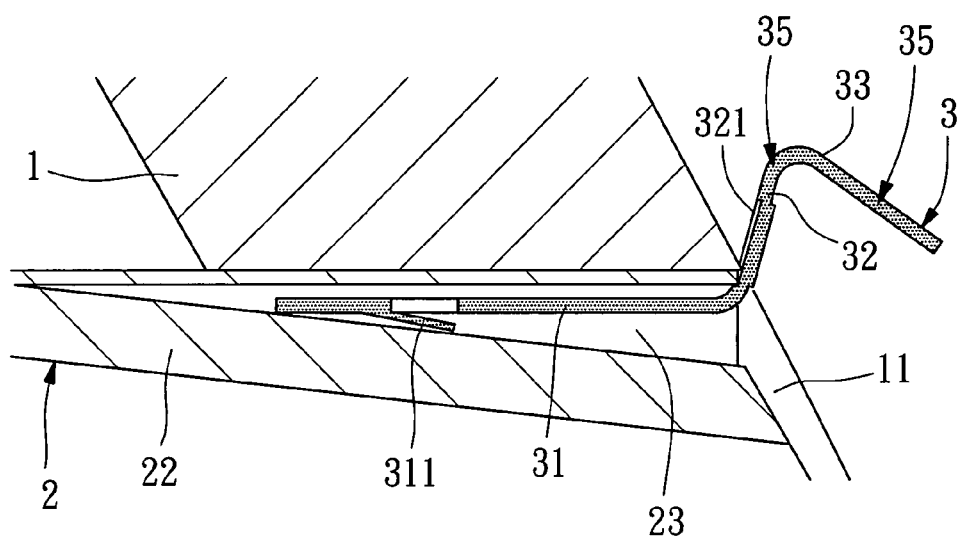
FIG. 8 is an enlarged view of a part of FIG. 7, showing the positioning of the retaining spring plate in the respective plughole relative to the wheel rim.

Referring to FIGS. 7 and 8, during installation, the wheel rim cover 2 is attached to the wheel rim 1 to stop the protruding strips 24 at the inner end edges of the associating mounting slots 11 of the wheel rim 1, and then give a pressure to the wheel rim cover 2 toward the wheel rim 1 to force the oblique face panels 33 of the retaining spring plates 3 through the associating mounting slots 11 and to have the stop panels 32 of the retaining spring plates 3 be stopped at the outer side of each of the mounting slots 11 (see FIG. 8), and therefore the wheel rim cover 2 is firmly secured to the wheel rim 1 by the retaining spring plates 3.

Further, the stop panel 32 of each retaining spring plate 3 has a recessed portion 321 (see FIG. 8) that reinforces the structural strength of the respective stop panel 32, enhancing the resilient power of the oblique face panel 33 of the respective retaining spring plate 3 and the contact tightness between the respective stop panel 32 and the inner side of the associating mounting slot 11.

As stated above, the protruding strips 24 of the wheel rim cover 2 are respectively stopped at the inner end edges of the associating mounting slots 11 of the wheel rim 1, minimizing the gap and elastic migration between the through holes 21 and the corresponding mounting slots 11 and lowering the risk of escape of the retaining spring plates out of position.

Further, by means of the respective oblique face panels 33, the retaining spring plates 3 can easily be moved through the associating mounting slots 11 from the front side of the wheel rim 1 to the back side thereof, making the mounting and dismounting procedures of the wheel rim cover 2 easy. Further, because the stop panel 32 and the oblique face panel 33 each have the respective opposite lateral side edges chamfered 35, the retaining spring plates 3 do not scratch the surface of the wheel rim 1 during installation. In conclusion, the invention eliminates the drawbacks of the prior art design.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A wheel cover mounting structure for mounting on a concave wheel disc having a plurality of mounting slots, comprising:

a generally circular wheel cover comprising a plurality of through holes corresponding to said mounting slots, a plurality of protruding flanges each extending substantially perpendicularly from a back side of said wheel cover surrounding each of said through holes and adapted to be insertable into said mounting slots, a plurality of plugholes respectively provided at a first wall surface of said protruding flanges, and a plurality of protruding strips extending from a second wall surface of said protruding flanges for stopping against a respective inner end edge of the corresponding mounting slot; and a plurality of retaining spring plates respectively mounted in said plugholes each comprising a plug panel respectively plugged into the plugholes of said wheel cover, a stop panel obliquely extending from one side of said plug panel, and an oblique face panel obliquely extending from one side of said stop panel opposite to said plug panel in a direction forming a chevron shape with said stop panel, said stop panel and said oblique face panel each having two opposite chamfered lateral side edges.

2. The wheel cover mounting structure for mounting on a wheel disc having a plurality of mounting slots as claimed in claim 1, wherein said stop panel has a plurality of recessed portions.

3. The wheel cover mounting structure for mounting on a wheel disc having a plurality of mounting slots as claimed in claim 1, wherein said plugholes are respectively provided at an outer side of each of said protruding flanges near the periphery of said wheel cover; said protruding strips are respectively provided at an inner side of each of the corresponding protruding flanges remote from the periphery of said wheel cover.

4. The wheel cover mounting structure for mounting on a wheel disc having a plurality of mounting slots as claimed in claim 1, wherein said stop panel is arched.

* * * * *